Dec. 17, 1968  J. E. WISER  3,417,211
INTERMITTENT DRIVE MECHANISM AND A TIMER UTILIZING SUCH
Filed March 24, 1966  3 Sheets-Sheet 1
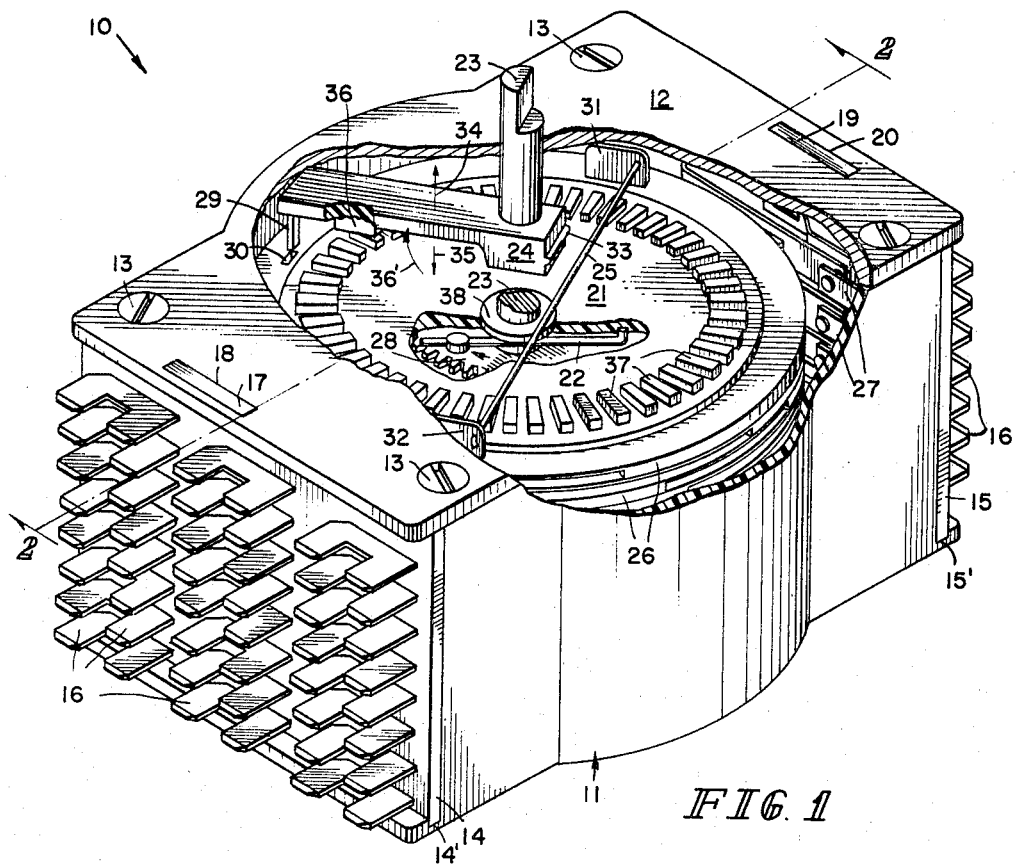
FIG. 1
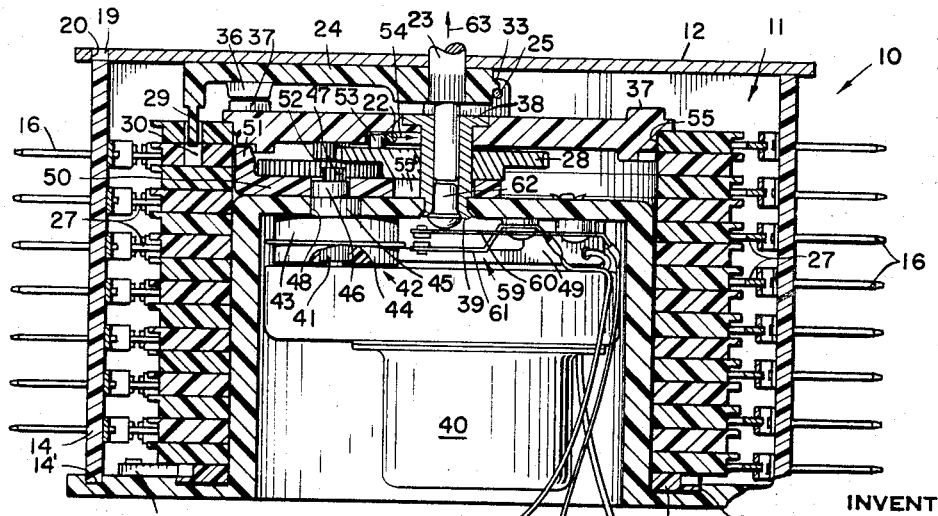
FIG. 2
INVENTOR
JOSEPH E. WISER
BY
ATTORNEY Dec. 17, 1968 J. E. WISER 3,417,211
INTERMITTENT DRIVE MECHANISM AND A TIMER UTILIZING SUCH
Filed March 24, 1966 3 Sheets-Sheet 2
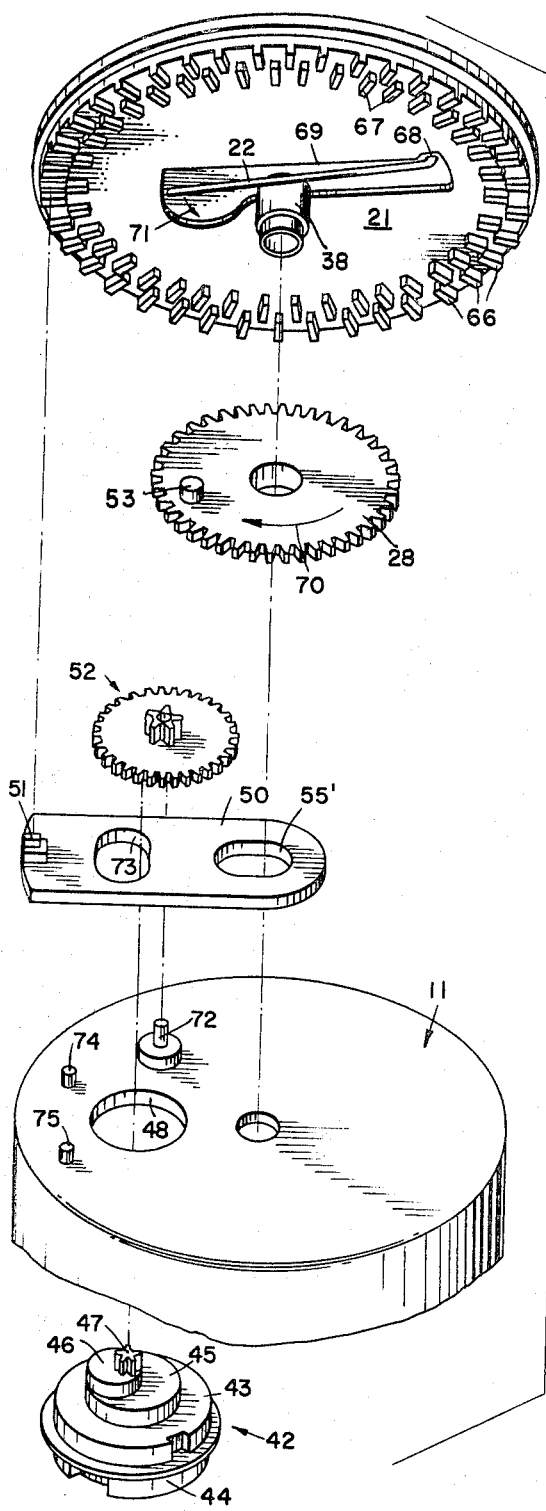
FIG. 3
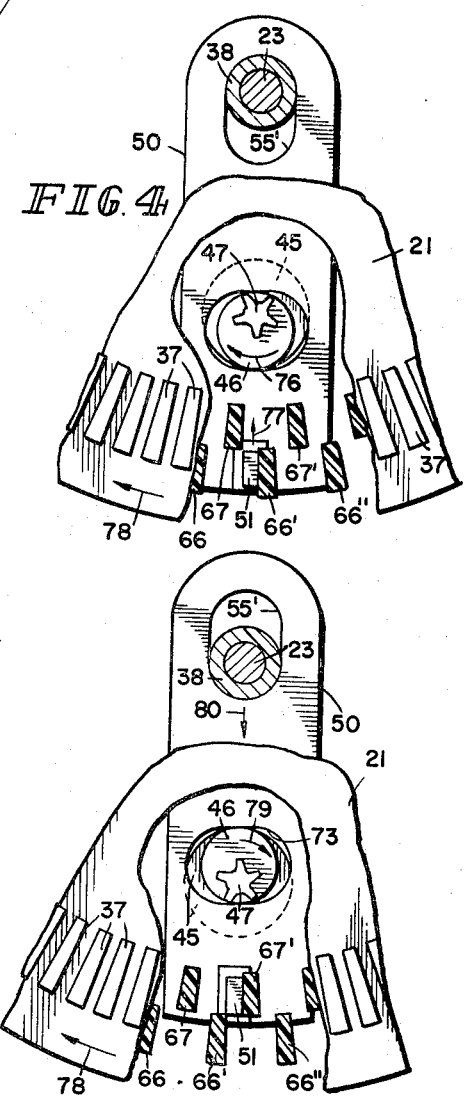
FIG. 4
FIG. 5
INVENTOR
JOSEPH E. WISER
BY
ATTORNEY

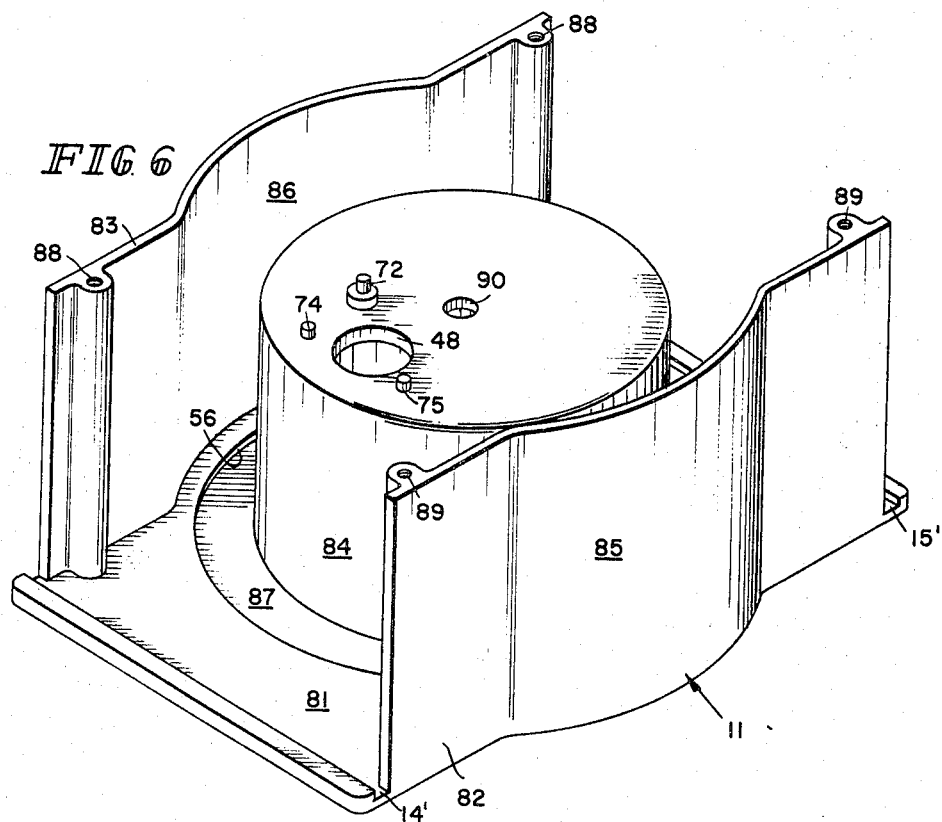
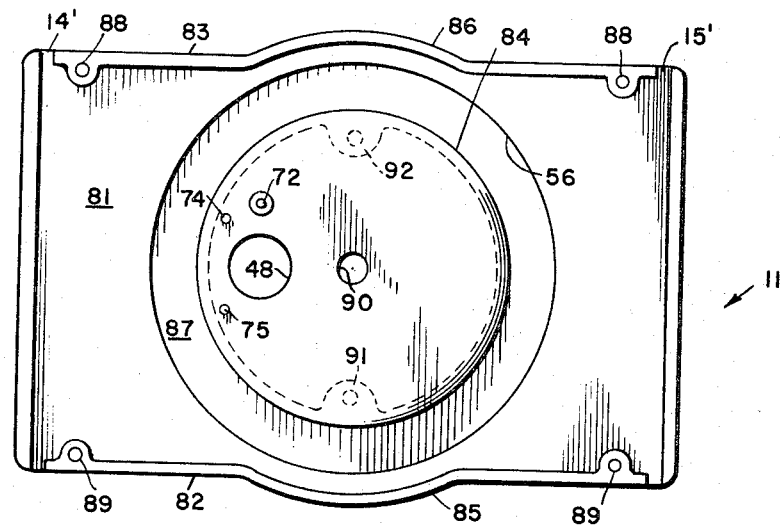
INVENTOR
JOSEPH E. WISER
BY
*[signature]*
ATTORNEY

United States Patent Office 3,417,211
Patented Dec. 17, 1968

3,417,211
INTERMITTENT DRIVE MECHANISM AND A TIMER UTILIZING SUCH
Joseph E. Wiser, Indianapolis, Ind., assignor to P. R. Mallory & Co. Inc., Indianapolis, Ind., a corporation of Delaware
Filed Mar. 24, 1966, Ser. No. 537,034
23 Claims. (Cl. 200—38)

ABSTRACT OF THE DISCLOSURE

An intermittent drive mechanism and a timer utilizing such, said mechanism including a rotatable member having inner and outer peripheral rings of spaced stop means staggered with respect to each other, means to alternately intercept the rotating path of the inner and outer rings of stop means, and means to advance the rotary member along its rotating path as the said means alternately intercept the inner and outer rings of the stop means. The rotatable member is connected to cam means of the timer to advance the cam means as the rotatable member is advanced.

---

The present invention relates to timers and more particularly to the means and methods for providing new and useful improvements in timers of the type having a plurality of control cams and a plurality of control switches adapted to be operated by the control cams.

Timers of the type having a plurality of control cams and a plurality of control switches adapted to be operated by the control cams are widely used in appliance control applications. Generally, such timers have an established program through which they are driven by an intermittent drive mechanism. An intermittent drive mechanism, sometimes referred to as an escapement mechanism, is a means for coupling the output shaft of a constant speed motor to the control cams of the timer. The purpose of the intermittent drive mechanism is to provide a periodic, snap-action rotational motion to the control cams. The snap-action rotational motion is required for fast operation of the control switches.

As appliances become more complicated, the timers required to control the appliances become larger and larger. However, the space being allowed for timers by the appliance manufacturers is not increasing and, in some cases, is decreasing. Also, timers required for controlling the complicated appliances must be more accurate. Positioning of the control cams with each snap-action rotation is very critical. Therefore, the intermittent drive mechanism must not overthrow the control cams.

Accordingly, there is presented in this specification, a timer having a large number of control cams for operating control switches without wasted space. The timer of the present invention contains an intermittent drive mechanism, including a motor, which is contained within the space circumscribed by ring-shaped control cams. The intermittent drive mechanism of the present invention provides an accurate snap-action rotational motion to the control cams and eliminates the possibility of overthrow of the control cams.

The intermittent drive mechanism of the present invention has fewer parts and occupies less space than contemporary drive mechanisms which perform similar functions. In addition, the intermittent drive mechanism of the present invention can be manufactured for less than contemporary mechanisms.

The housing of the timer of the present invention permits assembly of the motor in a formed recess which extends upwardly into the area circumscribed by the control cams. The motor is accessible from the outside of the housing and may be removed and returned or replaced without disturbing an other element of the timer. This feature is especially advantageous since timer motors frequently wear out and must be replaced before other elements of the timer.

In one embodiment of the present invention, a major portion of the housing for the timer is an integrally formed insulated structure. This structure includes the recess about which the ring-shaped control cams are disposed and base and sidewalls for supporting the top cover and a pair of terminal boards which serve as the ends of the housing. The control switches of the timer are mounted on the terminal boards. In order to conserve space, the sidewalls of the integrally formed structure can have oppositely disposed arcuate sections adjacent to the aforementioned recess so as to provide a ring-shaped opening for the control cams.

Other features of the timer of the present invention will become apparent as this specification progresses.

It is an object of the present invention to provide a timer having electrical switching capacity sufficient for controlling modern appliances which occupies a minimum of space.

It is another object of the present invention to mount the motor of a timer in a recess of the timer housing so that said motor is completely accessible and can be replaced without disturbing other elements of the timer.

It is still another object of the present invention to provide a timer housing having an integrally formed insulated structure including a base, sidewalls, and a recess formed in said base for receiving the motor of the timer.

It is a further object of the present invention to provide a timer having an intermittent drive mechanism, including a motor, completely disposed in the space circumscribed by the ring-shaped control cams of the timer.

It is still a further object of the present invention to provide an intermittent drive mechanism for a timer which has a minimum number of parts, can be inexpensively manufactured and is reliable in operation.

It is yet another object of the present invention to provide an intermittent drive mechanism for a timer which eliminates the problem of overthrow of the control cams.

Still another object of the present invention is to provide an intermittent drive mechanism for a timer which occupies a minimum of space.

Still a further object of the present invention is to provide an intermittent drive mechanism for a time which has a rotary member, a spring means for driving the rotary member, a slider member for engaging and disengaging the rotary member, and a means for deflecting the spring so as to store energy therein.

It is a further object of the present invention to provide a timer having a manual means for disengaging the intermittent driving mechanism and rotating the control cams.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in conjunction with the accompanying drawings and wherein like reference numbers describe elements of similar function therein and wherein the scope of the invention is determined rather from the dependent claims.

For illustrative purposes, the invention will be described in conjunction with the accompanying drawings in which:

FIGURE 1 is a fragmentary perspective view of the 3,417,211

3 timer and intermittent drive mechanism of the present invention.

FIGURE 2 is a sectional view 2—2 taken from FIGURE 1 illustrating the various components of the intermittent drive mechanism of the present invention.

FIGURE 3 is an exploded perspective view of the intermittent drive mechanism of the present invention.

FIGURE 4 is a fragmentary view showing one phase of the operation of the slider member of the intermittent drive mechanism.

FIGURE 5 is another fragmentary view showing a second phase of the operation of the slider member of the intermittent drive mechanism.

FIGURE 6 is a perspective view of the integrally formed walled structure which comprises most of the housing for the timer of the present invention.

FIGURE 7 is a top view of the integrally formed walled structure shown in FIGURE 6.

Generally speaking, the present invention is a timer having a housing which permits maximum utilization of space and an intermittent drive mechanism disposed in said housing so as to couple the motor of the timer to the control cams. The housing has a substantially flat bottom portion, a pair of sidewalls extending upwardly therefrom in an essentially vertical plane, a pair of terminal boards extending upwardly from each end of said flat bottom portion so as to fit between said sidewalls, and a top cover fastened to said sidewalls and said terminal boards. There is a substantially cylindrically shaped recess formed in substantially the center of the flat bottom portion so as to extend upwardly into the housing. The motor is mounted in the recess so as to be entirely contained within the space defined by the sidewalls and terminal boards. A unitary assembly of ring-shaped control cams is arcuately disposed about the recess and a means is provided for preventing backward rotation of the unitary assembly. The intermittent drive mechanism is disposed within the housing in the space between the top of said recess and the top cover. There are a plurality of control switches mounted in the housing so as to be operated by the control cams. A manual means is provided for disengaging the intermittent drive mechanism and rotating the control cams.

The intermittent drive mechanism of the present invention utilizes a rotary member having a plurality of evenly spaced stops circularly disposed thereon and a means for periodically disengaging one of the stops and engaging another of said stops so as to permit the rotary member to advance a distance determined by the space between the stops. The means for disengaging and engaging the stops on the rotary member is coupled to and driven by the motor for the time. There is a spring means for driving the rotary member when the disengaging and engaging means is operated and a means for deflecting the spring means so as to store energy therein. The means for deflecting the spring means is also coupled to and driven by the motor for the timer. Finally, there is a means for coupling the rotary member to the control cams of the timer.

Referring now to the drawing, and particularly to the perspective view of FIGURE 1, the components and structure of the present invention can be visualized in conjunction with the following description.

The timer 10 is enclosed in a housing consisting of a walled structure 11, which will be further described in conjunction with FIGURES 6 and 7, top plate 12, terminal board 14 and terminal board 15.

A plurality of screws 13 secure the top plate 12 to the walled structure 11. It can be seen that the terminal board 14 is secured by means of a groove 14' in the walled structure 11 and a portion 17 which protrudes through a slot 18 in the top plate 12. It can also be seen that the terminal board 15 is held by means of a groove 15' in the walled structure 11 and has a portion 19 which protrudes through a slot 20 in the top plate 12.

A portion of the housing has been broken away in FIGURE 1 to illustrate the arrangement of a rotary member, hereinafter referred to as the escapement wheel 21, drive spring 22, shaft 23, coupling arm 24, detent wire 25, plurality of control cams 26, plurality of control switches 27, and spring drive gear 28.

4

The escapement wheel 21 is the driven member of the intermittent drive mechanism of the present invention. The energy storage means for the intermittent drive mechanism is the drive spring 22 which is connected to the escapement wheel 21 and disposed so as to be deflected by the rotation of the gear 28.

The shaft 23 is journaled in the top plate 12 and a portion of the walled structure 11. The coupling arm 24 is connected to the shaft 23 and is adapted to be moved axially and rotatably with said shaft. There is a protruding portion 29 on the coupling arm 24 which is adapted to engage an aperture 30 in the first two of the control cams 26 so as to rotate the control cams when the shaft 23 is rotated in the direction of the arrow 36'.

The detent wire 25 is suspended between the protruding portion of a pair of staking bars 31 and 32 which hold the control cams 26 together. There is a ridge 33 on the coupling arm 24 which engages the detent wire 25 when the shaft 23 is displaced axially in the direction of the arrows 34 and 35.

There is a lug 36 for releasably engaging a circular ring of lugs 37 formed on the escapement wheel 21. When the lug 36 is engaged with the lugs 37, rotation of the escapement wheel in the direction of the arrow 36' will rotate the cams 26 by means of the protruding portion 29 of the coupling arm 24 which is continually engaged with the aperture 30.

Referring now to FIGURE 2, a sectional view 2—2 taken from FIGURE 1 can be discussed.

The shaft 23 is rotatably supported in a bearing 38 which is fastened to the walled structure 11 at a point 39. A detailed discussion of the walled structure 11 will be provided in conjunction with FIGURE 6. The escapement wheel 21 and gear 28 are rotatably supported in the outer diameter of the bearing 38.

It can be seen that a motor 40 is mounted in a recessed portion of the walled structure 11 so as to be entirely contained within the area circumscribed by the walled structure. An advantage of mounting the motor 40 as shown in FIGURE 2 is that it can be removed easily from the timer 10 without disturbing any other element of the timer.

The output of the motor 40 is a pinion gear 41 which can be coupled to the rotor of the motor by the usual gear reduction means of small low speed synchronous motors.

A unitary rotary member 42 is slipped over the pinion gear 41. The unitary rotary member has a pair of cam surfaces 43 and 44 for actuating switches, a bearing surface 45, an eccentric 46 and a pinion gear 47. The bearing surface 45 fits an aperture 48 in the recess of the walled structure 11.

The cam surfaces 43 and 44 are adapted to operate subinterval switches. A subinterval switch 49 is shown in FIGURE 2. Subinterval switches are cam-operated switches for providing an electrical output at times other than when the timer 10 is advanced at predetermined intervals by the intermittent drive mechanism.

The eccentric 46 is adapted to operate a slider member 50 as the unitary rotary member 42 is rotated by the pinion gear 41. There is a lug 51 on the slider member 50 which engages stop lugs on the escapement wheel 21. The operation of the slider member 50 and the escapement wheel 21 will be discussed in detail in conjunction with FIGURES 3, 4 and 5.

It can be seen that the slider member 50 has an elongated slot 55' which permits the slider member to slide about the outer diameter of the bearing 38.

The pinion gear 47 is engaged with the gear of a gear and pinion stage 52. The pinion of the gear and pinion stage 52 is engaged with the gear 28. Thus, the gear 28 is driven by the motor 40 pinion gear 41 through the gear and pinion reduction stage 52.

There is a post 53 on the gear 28 for engaging and loading the drive spring 22 in the direction of the arrow 54 as the gear 28 is rotated.

The control cams 26 are ring-shaped cams which are held together by the staking bars 31 and 32 shown in FIGURE 1. In an optional embodiment, a molded assembly could be devised for providing all of the cam surfaces in a unitary body. The control cam 26 assembly has a bearing surface on the outer shoulder 55 of the escapement wheel 21 and a bearing surface on the shoulder 56 of a groove formed in the walled structure 11. An outer diameter of a ratchet wheel 57 rides in the groove 56. The ratchet wheel 57 is staked to the control cams 26 by means of the staking bars 31 and 32.

There is a backup pawl 58 connected to the walled structure 11 and engaged with the ratchet wheel 57 for preventing backward rotation of the cams 26 and ratchet wheel 57.

There is a line switch 59 consisting of the spring contact member 60 and fixed contact member 61. When the shaft 23 is pulled axially in the direction of the arrow 63, the spring contact member 60 will lift the actuator 62 in the direction of the arrow 63 and the line switch 59 will be opened. When the shaft 23 is pushed axially in a direction opposite the arrow 63, the actuator 62 will be moved axially in the bearing 38 to close the line switch 59.

Referring now to FIGURE 3, an exploded perspective view of the intermittent drive mechanism of the present invention can be discussed.

It can be seen that the escapement wheel 21 has two circular and concentric rings of stop lugs. The lugs 66 in the outer ring and the lugs 67 in the inner ring are all equally and radially spaced to determine the maximum travel or escape action of the intermittent drive mechanism. Each of the lugs 67 of the inner ring is radially spaced between a pair of lugs 66 in the outer ring to form a plurality of evenly spaced slots.

The drive spring 22 is anchored at one end 68 in the escapement wheel 21. It can be seen that the drive spring 22 is contained in a cutout 69 in the escapement wheel 21.

When the gear 28 is rotated in the direction of the arrow 70, the post 53 on the gear deflects the spring 22 in the direction of the arrow 71 to store energy for the snap-action of the intermittent drive mechanism. The intermittent drive mechanism of the present invention may be designed so that the spring 22 is preloaded upon assembly of the gear 28 on the bearing 38.

The stored energy in the spring 22 is released by the movement of the slider member 50 which has a lug 51 for alternately engaging the lugs 66 and 67 on the escapement wheel 21. The operation of the lug 51 in alternately engaging the lugs 66 and 67 will be discussed in detail in conjunction with FIGURES 4 and 5.

The gear and pinion stage 52 is rotatably supported on the bearing post 72 which is staked to the recessed portion of the walled structure 11.

The eccentric 46 on the unitary rotary member 42 operates in a cutout 73 in the slider member 50. The shape of the cutout 73 is designed to permit the camming action of the eccentric 46 in periodically displacing and returning the slider member. A pair of posts 74 and 75 are provided on the walled structure 11 to guide the slider member 50.

Referring now to FIGURE 4, a fragmentary view showing the operation of the slider member 50 and the escapement wheel 21 can be discussed.

As the eccentric 46 rotates in the direction of the arrow 76, the slider member 50 will be moved in the direction of the arrow 77. Since the escapement wheel is spring loaded in the direction of the arrow 78 by the drive spring 22, not shown in FIGURE 4, the escapement wheel will be advanced as soon as the lug 51 clears the stop lug designated as 66' and will be stopped by the stop lug designated as 67'. Therefore, the escapement wheel 21 is advanced an amount determined by the spacing of the stop lugs 66 and 67. When the stop lug 67' strikes the lug 51 in the slider mechanism 50, the escapement wheel 21 will be immediately stopped. Therefore, there can be no overthrow of the escapement wheel 21.

Referring now to FIGURE 5, another view illustrating the operation of the slider member 50 and the escapement wheel 21 can be discussed.

As the eccentric 46 rotates farther in the direction of the arrow 79, the slider member 50 will be moved in the direction of the arrow 80. Since the escapement wheel 21 is spring loaded in the direction of the arrow 78, it will be advanced as soon as the lug 51 on the slider member 50 clears the stop lug designated as 67' and will be stopped by the stop lug designated as 66".

Referring to both FIGURES 4 and 5, therefore, it can be seen that the escapement wheel 21 is advanced twice each time that the slider member 50 is displaced and returned by the eccentric 46. The amount of advancement of the escapement wheel 21 is determined by the space between the stop lugs 66 in the outer ring and the stop lugs 67 in the inner ring. The amount of travel of escapement wheel 21 is limited by one of the stop lugs 66 or 67 butting against the lug 51 on the slider member.

Referring now to FIGURE 6, a perspective view of the integrally formed walled structure 11 can be discussed.

The walled structure 11 has a substantially flat base portion 81, a pair of sidewalls 82 and 83 extending up from said base portion and a substantially cylindrically shaped recess 84 extending up from the center of said base portion. The wall 82 has an arcuately shaped section 85 disposed about the recess 84 and the wall 83 has an arcuately shaped section 86 also disposed about the recess 84. A circular track 87 is formed in the base portion 81 about the recess 84. The edge 56 of the track 87 is a bearing surface for the aforementioned ratchet wheel 57.

The purpose of the substantially cylindrically shaped recess 84 is to provide a mounting means for the motor 40 of the timer which is entirely disposed within the housing. The ring-shaped control cams 26 for the timer rotate about the recess which contains the motor 40. It can be seen, therefore, that there is much less wasted space than there would be if the motor 40 was mounted externally to the housing.

Threaded means 88 in the wall 83 and threaded means 89 in the wall 84 are provided for mounting a cover over the top of the walled structure. The screws 13, shown in FIGURE 1, engage the threaded means 88 and 89 to secure the top plate 12.

A hole 90 in the center of the flat topmost portion of the recess 84 is adapted to receive the reduced portion of the bearing 38.

Referring now to FIGURE 7, a top view of the walled structure 11 shown in FIGURE 6 can be discussed.

It can be seen that the wall sections 85 and 86 and the outer diameter of the recess 84 provides a ring-shaped area for containing the ring-shaped control cams 26 of the timer 10. The space on each end of the timer 10 is available for the control switches 27 which are operated by the cams 26.

A pair of mounting brackets 91 and 92 are provided for the motor 40 which fits in the recess 84. The brackets 91 and 92 are shown in dashed lines in FIGURE 7.

With the above description of components and structure in mind, and by making reference to the drawing figures, the following analysis of operation will serve to convey the functional details of the present invention.

The shaft 23, shown in both FIGURES 1 and 2, is a means for manually positioning the control cams 26 of the timer 10. When the shaft 23 is pulled axially in the direction of the arrow 34, shown in FIGURE 1, the lug 36 on the coupling arm 24 is no longer engaged with the lugs 37 on the escapement wheel 21 and the control cams 26 and ratchet wheel 57 can be turned independently with respect to said escapement wheel. The protruding portion 29 of the coupling arm 24 will always be engaged with the aperture 30 in the cams 26.

The axial movement of the shaft 23 in the direction of the arrow 63, shown in FIGURE 2, will open the line switch 59 so as to prevent any electrical output from the timer during manual adjustment.

The timer 10 is advanced through the programmed timing cycle by intermittent steps. Each step is a predetermined angular rotation which takes place at high speed. This action is sometimes referred to as an escapement action. The escapement wheel 21 is the driven member of the intermittent driving mechanism of the present invention. The coupling arm 24 couples the escapement wheel 21 to the control cams 26. Hence, when the shaft 23 is pushed in the direction of the arrow 35, shown in FIGURE 1, and the lug 36 is engaged with one of the lugs 37 on the escapement wheel, the snap-action rotational motion of the escapement wheel 21 will be coupled to the control cams 26.

The snap-action or escapement action of the escapement wheel 21 is produced by energy stored in the spring 22 by the rotation of the gear 28. When the escapement wheel 21 is released by the slider member 50, it will be advanced through a one step interval.

The intermittent drive mechanism of the present invention is therefore, comprised of the motor 40, eccentric 46, pinion gear 47, slider member 50, gear and pinion stage 52, spring drive gear 28, drive spring 22, and the escapement wheel 21.

The eccentric 46 is a means for periodically displacing and returning the slider member 50. The pinion gear 47, gear and pinion stage 52 and spring drive gear 28 are a means for deflecting the spring 22 so as to store energy therein. The slider member 50 is a means for engaging and releasing the escapement wheel at predetermined time intervals.

Referring to FIGURES 3, 4 and 5, it can be seen that rotation of the gear 28 will cause the post 53 to deflect the drive spring 22 while the escapement wheel 21 is being held by the slider member 50. Since the slider member 50 is being periodically displaced and returned while the gear 28 is being rotated, the escapement wheel 21 will be periodically advanced by the drive spring 22. The action of the slider member 50 in holding and releasing the escapement wheel 21 was discussed previously in conjunction with FIGURES 4 and 5.

The timer of the present invention, as hereinbefore described in one of its embodiments, is merely illustrative and not exhaustive in scope. Since many widely different embodiments of the invention may be made without departing from the scope thereof, it is intended that all matter contained in the above description and shown in the accompanying drawing shall be interposed as illustrative and not in a limiting sense.

What is claimed is:

1. An intermittent drive mechanism for a timer of the type having a plurality of cams for operating a plurality of control switches, said drive mechanism comprising: a motor; a rotary member having an inner ring and outer ring of lugs disposed thereon, said lugs being radially disposed so as to define a plurality of equally spaced slots between said lugs in said inner ring and said lugs in said outer ring; means for periodically disengaging one of said lugs and engaging another of said lugs so as to permit said rotary member to advance a distance determined by the space between said lugs, said disengaging and engaging means being coupled to and driven by said motor; spring means for driving said rotary member when said disengaging and engaging means is operated, said spring means being connected to said rotary member; means for deflecting said spring means so as to store energy therein, said deflecting means being coupled to and driven by motor, and means for coupling said rotary member to said cams of said timer.

2. An intermittent drive mechanism as in claim 1 wherein there is a slider member having a lug disposed thereon, said lug being adapted for movement in said slots so as to alternately engage said lugs in said inner ring and said lugs in said outer ring.

3. An intermittent drive mechanism as in claim 1 wherein said disengaging and engaging means is a slider member, said slider member being coupled to and driven by an eccentric, said eccentric being coupled to and driven by said motor.

4. An intermittent drive mechanism as in claim 1 wherein said means for deflecting said spring means is a gear having a post thereon for engaging said spring, said gear being coupled to and driven by said motor.

5. An intermittent drive mechanism for a timer of the type having a plurality of cams for operating a plurality of control switches, said drive mechanism comprising: a motor; a rotary member having an inner ring and outer ring of stop lugs disposed thereon, said stop lugs being radially disposed so as to define a plurality of equally spaced slots between said stop lugs in said inner ring and said stop lugs in said outer ring; a slider member having a lug disposed thereon, said lug being adapted for movement in said slots so as to alternately engage said stop lugs in said inner ring and said stop lugs in said outer ring; spring means for driving said rotary member when said lug on said slider member is moved in said slots, said spring means being connected to said rotary member; means for deflecting said spring means so as to store energy therein, said deflecting means being coupled to and driven by said motor; means for periodically displacing said slider member, said displacing means being coupled to and driven by said motor; and means for coupling said rotary member to said cams of said timer.

6. An intermittent drive mechanism as in claim 5 wherein said spring means is a wire spring anchored at one end on said rotary member and having a free end disposed so as to be deflected about the rotational axis of said rotary member.

7. An intermittent drive mechanism as in claim 5 wherein there is a gear rotatably mounted about the rotational axis of said rotary member, said gear being free to rotate with respect to said rotary member and having a post disposed thereon for deflecting said spring means when said gear is rotated, said gear being coupled to and driven by said motor.

8. An intermittent drive mechanism as in claim 5 wherein said means for periodically displacing said slider member is an eccentric means coupled to and driven by said motor.

9. An intermittent drive mechanism as in claim 5 wherein said means for coupling said rotary member to said cams of said timer comprises a coupling bar fixedly connected to an axially moveable shaft, said coupling bar having a protruding portion for continually engaging said cams and a lug for engaging a plurality of stops radially spaced about said rotary member when said shaft is axially moved towards said rotary member.

10. A timer comprising: a housing having a substantially flat bottom portion, a pair of sidewalls extending upwardly therefrom in an essentially vertical plane, a pair of terminal boards extending upwardly from each end of said flat bottom portion so as to fit between said sidewalls, and a top cover fastened to said sidewalls and said terminal boards, said flat bottom portion having a substantially cylindrically shaped recess formed in substantially the center thereof and extending upwardly into said housing; a motor mounted in said recess so as to be entirely contained within the space defined by said sidewalls and terminal boards, said motor being accessible from the bottom of said housing; a unitary assembly of ring-shaped control cams arcuately disposed about said recess; means for preventing backward rotation of said unitary assembly of ring-shaped control cams; an intermittent drive mechanism for coupling said motor to said ring-shaped control cams, said drive mechanism being disposed within said housing in the space between the top of said recess and said top cover; a plurality of control switches mounted in said housing so as to be operated by said ring-shaped control cams; and manual means for disengaging said intermittent drive mechanism and rotating said ring-shaped control cams.

11. A timer as in claim 10 wherein said sidewalls have oppositely disposed arcuate sections adjacent to said recess so as to form a ring-shaped opening thereabout for receiving said ring-shaped control cams.

12. A timer as in claim 10 wherein said substantially flat bottom portion, sidewalls and recess of said housing are integrally formed.

13. A timer as in claim 10 wherein said substantially flat bottom portion, sidewalls and recess of said housing are integrally formed out of an insulating material.

14. A timer as in claim 10 wherein said motor has an output shaft extending upwardly into said housing through the top of said recess.

15. A timer as in claim 10 wherein said intermittent driving mechanism comprises: a rotary member having a plurality of evenly spaced stops circularly disposed thereon; means for alternately disengaging one of said stops and engaging another of said stops so as to permit said rotary member to advance a distance determined by the space between said stops, said disengaging and engaging means being coupled to and driven by said motor; spring means for driving said rotary member when said disengaging and engaging means is operated, said spring means being connected to said rotary member; and means for deflecting said spring means so as to store energy therein, said deflecting means being coupled to and driven by said motor.

16. A timer as in claim 10 wherein there are a plurality of cams and cam-operated switches disposed between said motor and said top of said recess, said cams being coupled to and driven by said motor, said cam-operated switches being fastened to said housing so as to be operated by the rotation of said cams.

17. A timer as in claim 10 wherein said means for preventing backward rotation of said ring-shaped control cams comprises: a ratchet wheel arcuately disposed about said recess and connected to said ring-shaped control cams and a spring loaded back-up pawl mounted in said housing so as to engage said ratchet wheel.

18. A timer comprising: a housing having a substantially flat bottom portion, a pair of sidewalls extending upwardly therefrom in an essentially vertical plane, a pair of terminal boards extending upwardly from each end of said flat bottom portion so as to fit between said sidewalls, and a top cover fastened to said sidewalls and said terminal boards, said flat bottom portion having a substantially cylindrically shaped recess formed in the center thereof and extending upwardly into said housing, said sidewalls having oppositely disposed arcuate sections adjacent to said recess so as to form a ring-shaped opening thereabout; a motor mounted in said recess so as to be entirely contained within the space defined by said sidewalls and terminal boards, said motor being accessible from the bottom of said housing; a plurality of ring-shaped control cams arcuately disposed about said recess; means for holding said ring-shaped control cams together so as to provide a unitary rotary member; a ring-shaped ratchet wheel arcuately disposed about said recess and connected to said ring-shaped control cams; means engaged with ratchet wheel for preventing backward rotation of said ring-shaped control cams; an intermittent drive mechanism for coupling said motor to said ring-shaped control cams, said drive mechanism being disposed within said housing in the space between the top of said recess and said top cover; a plurality of control switches mounted on said terminal boards and adapted to be operated by said ring-shaped control cams; and manual means for disengaging said intermittent drive mechanism and rotating said ring-shaped control cams.

19. In a sequential timer, a substantially constant speed motor and an intermittent drive mechanism for advancing at least one cam for actuating at least one control switch, said drive mechanism including a rotary member having inner and outer rings of spaced stop means displaced with respect to each other, means alternately engaging said stop means of said inner and outer rings, means to advance said rotary member along its rotational path between the time said means alternately engages said inner and outer rings of stop means and means connecting said rotary member to said cam.

20. In a sequential timer according to claim 19, wherein said means alternately engaging said stop means of said inner and outer rings is a slider member, said slider member being coupled to and driven by an eccentric, said eccentric being driven by said constant speed motor.

21. In a sequential timer according to claim 19, wherein said means to advance said rotary member along its rotational path includes spring means and means to deflect said spring means so as to store energy therein.

22. In a sequential timer according to claim 21, wherein said deflecting means is a gear means having a post thereon for engaging said spring, said gear means being coupled to and driven by said constant speed motor.

23. In a sequential timer according to claim 19, wherein said inner and outer rings of stop means ars disposed on the face of said rotary member and said stop means are lugs with the lugs of one ring being located between the lugs of the other ring.

References Cited

UNITED STATES PATENTS

| 3,033,999 | 5/1962 | Thornbery et al. | 307—141.4 |
| 3,313,895 | 4/1967 | Dotto | 200—38 |

ROBERT K. SCHAEFER, *Primary Examiner.*

H. O. JONES, *Assistant Examiner.*